US008921746B2

(12) United States Patent
Baarman et al.

(10) Patent No.: US 8,921,746 B2
(45) Date of Patent: Dec. 30, 2014

(54) INDUCTIVELY-HEATED APPLICATOR SYSTEM

(75) Inventors: David W. Baarman, Fennville, MI (US); Richard Bylsma, Ada, MI (US); Thomas Jay Leppien, Grand Haven, MI (US); Jesse C. Leverett, Rockford, MI (US); Steve O. Mork, Lowell, MI (US)

(73) Assignee: Access Business Group International LLC, Ada, MI (US)

( * ) Notice: Subject to any disclaimer, the term of this patent is extended or adjusted under 35 U.S.C. 154(b) by 1355 days.

(21) Appl. No.: 12/126,190

(22) Filed: May 23, 2008

(65) Prior Publication Data

US 2009/0289055 A1 Nov. 26, 2009

(51) Int. Cl.

| | |
|---|---|
| ***H05B 6/04*** | (2006.01) |
| ***B05C 17/00*** | (2006.01) |
| ***H02J 7/00*** | (2006.01) |
| ***A45D 40/26*** | (2006.01) |
| ***H05B 6/10*** | (2006.01) |
| ***B05C 1/00*** | (2006.01) |

(52) U.S. Cl.

CPC .............. *A45D 40/261* (2013.01); *H05B 6/105* (2013.01); *A45D 2200/056* (2013.01); *B05C 1/003* (2013.01); *A45D 2200/155* (2013.01); *A45D 2200/055* (2013.01); *B05C 1/00* (2013.01)

USPC ........... 219/660; 219/618; 219/759; 219/628; 219/635; 219/214; 401/1; 401/2; 401/208; 320/108; 320/134; 320/162; 320/163; 320/164

(58) Field of Classification Search

CPC .................... G01N 2035/00425; H05B 6/105; H05B 6/04; A45D 2200/055

USPC ......... 219/660, 618, 759, 619, 628–630, 635, 219/621, 214; 401/1, 2, 208; 320/108, 134, 320/162–164; 222/146.3, 54

See application file for complete search history.

(56) References Cited

U.S. PATENT DOCUMENTS

| | | | | |
|---|---|---|---|---|
| 1,772,501 A | | 8/1930 | Shelton | |
| 3,335,910 A | * | 8/1967 | Rossi | 222/54 |

(Continued)

FOREIGN PATENT DOCUMENTS

| | | |
|---|---|---|
| CN | 1182562 | 5/1998 |
| CN | 1314802 | 9/2001 |

(Continued)

OTHER PUBLICATIONS

International Search Report and Written Opinion for International Application No. PCT/US2009/044821, mailed Nov. 30, 2009.

(Continued)

*Primary Examiner* — Dana Ross

*Assistant Examiner* — Ket D Dang

(74) *Attorney, Agent, or Firm* — Warner Norcross & Judd LLP

(57) ABSTRACT

An inductively-heated applicator system including a heating module and applicator or applicator pen. The heating module includes a dock for seating the applicator. The heating module includes circuitry to selectively generate an electromagnetic field to wirelessly provide energy to the applicator when it is positioned in the dock. The heating module may also include temperature control circuitry to at least one of monitor and control the temperature of the applicator. The applicator pen includes a heating element that may be heated through energy provided by the electromagnetic field. The heating element may be directly inductively heated by the electromagnetic field. The heating element may be a roller element that heats and applies the product. Alternatively, the applicator may include a secondary in which electrical power is induced when the electromagnetic field is present. In this alternative, the power may be applied to the heating element to produce resistive heat.

16 Claims, 10 Drawing Sheets

(56) References Cited

U.S. PATENT DOCUMENTS

| | | | | |
|---|---|---|---|---|
| 3,578,945 | A | 5/1971 | Ayres et al. | |
| 3,588,467 | A * | 6/1971 | Grosjean | 219/214 |
| 3,752,155 | A | 8/1973 | Blinoff, Jr. et al. | |
| 3,802,606 | A * | 4/1974 | Gust | 222/484 |
| 3,843,022 | A | 10/1974 | Radcliffe et al. | |
| 3,848,607 | A | 11/1974 | St. Clair | |
| 4,253,013 | A | 2/1981 | Mabuchi | |
| 4,261,485 | A * | 4/1981 | Borg | 222/500 |
| 4,291,685 | A | 9/1981 | Taelman | |
| 4,427,001 | A | 1/1984 | Kiefer et al. | |
| 4,465,073 | A | 8/1984 | Schwob | |
| 4,865,034 | A | 9/1989 | Van Der Molen | |
| 5,395,175 | A | 3/1995 | Bontoux et al. | |
| 5,556,468 | A | 9/1996 | Legrain et al. | |
| 5,702,032 | A * | 12/1997 | Loehrke | 222/63 |
| 5,775,344 | A | 7/1998 | Clay | |
| 5,816,726 | A * | 10/1998 | DeBourg et al. | 401/1 |
| 5,831,245 | A | 11/1998 | Debourg et al. | |
| 5,903,465 | A | 5/1999 | Brown | |
| 5,980,144 | A | 11/1999 | Debourg et al. | |
| 6,036,055 | A * | 3/2000 | Mogadam et al. | 222/23 |
| 6,072,362 | A | 6/2000 | Lincoln | |
| 6,141,227 | A | 10/2000 | Sheikh et al. | |
| 6,157,258 | A | 12/2000 | Adishian et al. | |
| 6,177,093 | B1 | 1/2001 | Lombardi et al. | |
| 6,232,585 | B1 | 5/2001 | Clothier et al. | |
| 6,255,635 | B1 | 7/2001 | Thompson et al. | |
| 6,271,508 | B1 | 8/2001 | Thompson et al. | |
| 6,312,397 | B1 | 11/2001 | Gebhard | |
| 6,316,756 | B1 | 11/2001 | Thompson et al. | |
| 6,348,679 | B1 | 2/2002 | Ryan et al. | |
| 6,359,267 | B1 | 3/2002 | Wilcox et al. | |
| 6,437,295 | B1 | 8/2002 | Hogg et al. | |
| 6,521,874 | B2 | 2/2003 | Thompson et al. | |
| 6,527,143 | B1 | 3/2003 | Schomäcker | |
| 6,600,142 | B2 | 7/2003 | Ryan et al. | |
| 6,617,557 | B1 | 9/2003 | Ryan et al. | |
| 6,649,888 | B2 | 11/2003 | Ryan et al. | |
| 6,652,175 | B2 | 11/2003 | Chang | |
| 6,662,976 | B2 * | 12/2003 | Jensen et al. | 222/481.5 |
| 6,664,881 | B1 | 12/2003 | Thompson et al. | |
| 6,709,180 | B2 | 3/2004 | Cochran | |
| 6,730,894 | B2 | 5/2004 | Thompson et al. | |
| 6,795,645 | B2 | 9/2004 | Hygema et al. | |
| 6,812,445 | B2 | 11/2004 | Gorbold | |
| 6,856,861 | B2 | 2/2005 | Dirksing et al. | |
| 6,861,629 | B2 | 3/2005 | Dahake et al. | |
| 6,911,010 | B2 | 6/2005 | Dirks et al. | |
| 6,995,345 | B2 | 2/2006 | Gorbold | |
| 7,108,438 | B2 | 9/2006 | Fontaine | |
| 7,201,294 | B2 | 4/2007 | Carlucci et al. | |
| 7,208,707 | B2 * | 4/2007 | Clothier et al. | 219/618 |
| 7,227,108 | B2 | 6/2007 | Clothier et al. | |
| 7,322,945 | B2 | 1/2008 | Dunmore | |
| 7,448,814 | B2 | 11/2008 | Bouix et al. | |
| 7,489,530 | B2 | 2/2009 | Paull | |
| 7,551,011 | B2 | 6/2009 | Paull | |
| 7,626,463 | B2 | 12/2009 | Paull | |
| 7,651,015 | B2 * | 1/2010 | Girard et al. | 222/509 |
| 7,695,207 | B1 | 4/2010 | Laghi | |
| 7,804,045 | B2 | 9/2010 | Rosenbloom et al. | |
| 7,883,287 | B2 | 2/2011 | Thorpe | |
| 7,909,044 | B2 | 3/2011 | Tranchant et al. | |
| 2003/0165550 | A1 | 9/2003 | Rhoades | |
| 2004/0096258 | A1 | 5/2004 | Kim | |
| 2006/0287616 | A1 | 12/2006 | Nan | |
| 2007/0049998 | A1 | 3/2007 | Conrad et al. | |
| 2007/0269251 | A1 | 11/2007 | Skalitzky et al. | |
| 2007/0286665 | A1 | 12/2007 | Bouix et al. | |
| 2008/0031833 | A1 | 2/2008 | Oblong et al. | |
| 2009/0208542 | A1 | 8/2009 | Barrow | |
| 2009/0208592 | A1 | 8/2009 | Barrow | |
| 2009/0209600 | A1 | 8/2009 | Miner et al. | |
| 2009/0289055 | A1 | 11/2009 | Baarman et al. | |
| 2011/0200381 | A1 | 8/2011 | Bylsma et al. | |

FOREIGN PATENT DOCUMENTS

| | | |
|---|---|---|
| CN | 1761443 | 4/2006 |
| JP | 5095820 | 4/1993 |
| JP | 2006089458 | 4/2006 |
| JP | 2008110324 | 5/2008 |
| JP | 2008212688 | 9/2008 |
| JP | 2009119149 | 6/2009 |
| WO | 9605648 | 2/1996 |
| WO | 9617499 | 6/1996 |
| WO | 0021686 | 4/2000 |
| WO | 2007/028033 | 3/2007 |
| WO | 2009/103574 | 8/2009 |

OTHER PUBLICATIONS

Irvin H. Blank, Robert J. Scheuplein, and Dorothy J. MacFarlane, Mechanism of Percutaneous Absorption, The Journal of Investigative Dermatology, 1967, 582-589, vol. 49 No. 6.

Franklin Akomeah, Tahir Nazir, Gary P. Martin and Marc B. Brown, Effect of heat on the percutaneous absorption and skin retention of three model penetrants, European Journal of Pharmaceutical Sciences, 2004, 337-345, vol. 21.

S.E. Burgess, M.A.A. O'Neill, A.E. Beezer, J. Hadgraft and S. Gaisford, Thermodynamics of membrane transport and implications for dermal delivery, J. Drug Del. Sci. Tech., 2005, 325-327, vol. 15 No. 4.

Ozone Beauty Product, http://www.syouei.url.tw/eng/product.asp, downloaded before Dec. 1, 2009.

Rolling Heat Pen, http://www.syouei.url.tw/eng/product.asp?p_ir=15, downloaded before Dec. 1, 2009.

U.S. Appl. No. 12/705,875 Office Action dated May 16, 2011.

U.S. Appl. No. 12/705,875 Office Action dated Oct. 28, 2011.

U.S. Appl. No. 12/705,875 Notice of Allowance and Fee(s) Due and Office Action dated Apr. 17, 2012.

Notice of Allowance for U.S. Appl. No. 12/705,875 mailed Jul. 18, 2014, pp. 1-7.

* cited by examiner

INDUCTIVELY-HEATED APPLICATOR SYSTEM

BACKGROUND OF THE INVENTION

The present invention relates to applicators for health and beauty products, and more particularly to applicators for applying health and beauty products in a heated state.

A wide variety of serums, salves and other health and beauty products are available for topical application. In some applications, these products are applied simply by hand. With many products, however, an applicator is available to assist the user in applying the product.

Applicators are available in a variety of different types. Simple applicators may utilize a brush or foam pad to apply the product. In some applications, the applicator may be more complex and may include a reservoir for the product. One conventional applicator includes a rolling ball for applying the product. In a typical rolling ball applicator, the rolling ball is positioned in the neck of a product reservoir with a portion exposed on the exterior of the applicator. As the rolling ball is rolled within the neck, it draws product out from the reservoir.

In some applications, it is desirable to heat the product prior to application. With some products, heat improves effectiveness, or simply provides a more pleasant product application experience.

SUMMARY OF THE INVENTION

The present invention provides an inductively-heated applicator system for applying heated serums, salves and other health and beauty products. The applicator generally includes a heating module and an applicator. The heating module includes circuitry, including a primary, for generating electromagnetic waves and the applicator includes a heating element that can be heated directly or indirectly by electromagnetic waves generated by the primary. In operation, the heating module heats the applicator inductively without wires or other direct electrical connections between the heating module and the applicator.

In one embodiment, the applicator includes a heating element that is directly inductively heated (i.e. the heating element is manufactured from a material that heats sufficiently in the presence of electromagnetic waves). In an alternative embodiment, the applicator may include a secondary that inductively receives power from the primary of the heating module, and the induced power may be used to heat the heating element. For example, the heating element may be a resistive element that is heated by the application of electrical current.

In one embodiment, the applicator includes a roller element for applying a serum, salve or other health and beauty products. The roller element may be manufactured from a material that heats in the presence of electromagnetic waves. In an alternative embodiment, a portion of the applicator tip is manufactured from a material that heats in the presence of electromagnetic waves. In another alternative embodiment, the roller element is partially enclosed in an isolator to thermally isolate and remove the roller element from the flow path of the product. A retainer may also assist in directing the flow path of the product.

In one embodiment, the heating module includes a dock to removably receive the applicator. For example, the applicator may be snap-fitted or frictionally fit into the dock. As another example, the applicator and heating module may include one or more magnets to retain the applicator in the dock. In one embodiment, the applicator includes a roller element and the dock is configured to retain the applicator with the roller element in the approximate center of the primary.

In one embodiment, the system includes temperature monitoring circuitry for controlling operation of the system based on temperature. For example, the heating module may stop generating electromagnetic waves when the application reaches a specific temperature. The temperature monitoring circuitry may be incorporated into the heating module and may provide temperature monitoring of the applicator. In one embodiment, the heating module may include a temperature sensor in physical contact with the application when the applicator is docked. The temperature sensor may be in direct engagement with the roller element. In an alternative embodiment, temperature monitoring circuitry may be included in the applicator and wirelessly communicate with the heating module.

In one embodiment, the system includes a capsule storage base. The capsule storage base may plug into the heating module to store a capsule of product for use with the applicator.

The present invention provides an inductively-heated applicator system that permits application of heated serums, salves and other health and beauty products to localized areas of a person's body. The system includes an applicator that is heated without wires or other direct electrical connections. Among other things, this simplifies use and operation of the applicator. Some products degrade faster once they have been heated. In some embodiments, heating of the product in the applicator is minimized in favor of heating either the product once it is external to the applicator or heating the area of interest to prepare the area to better respond to the product. Heat may also increase the rate at which some products are absorbed into the body and provide a warm sensation that can be more appealing than an experience with a room temperature applicator.

These and other objects, advantages, and features of the invention will be readily understood and appreciated by reference to the detailed description of the current embodiment and the drawings.

DESCRIPTION OF THE CURRENT EMBODIMENT

Figure 1:
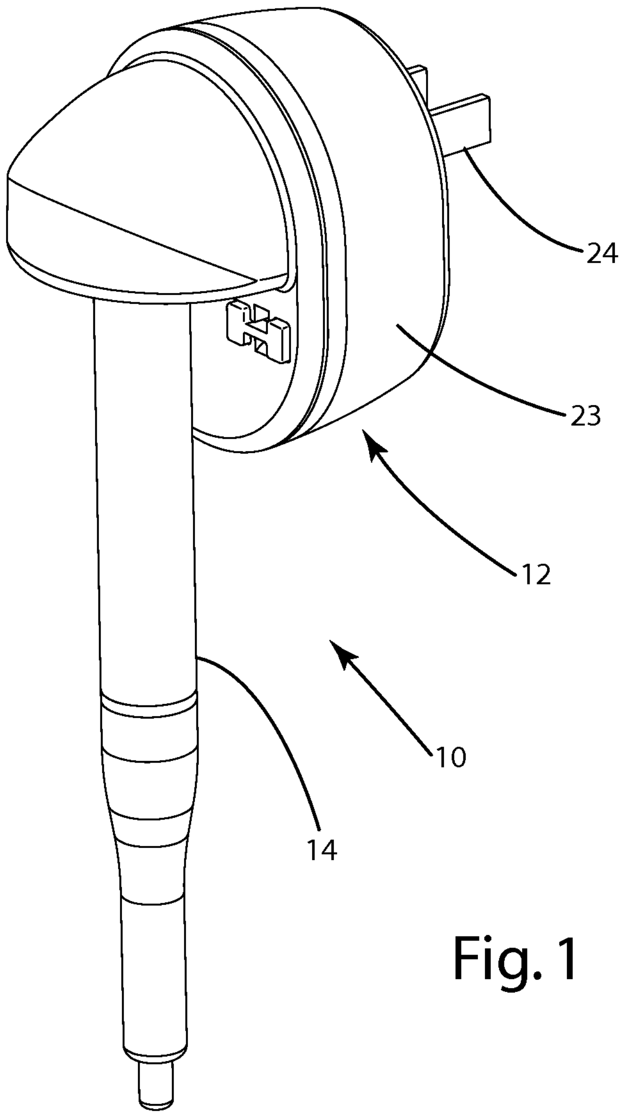
FIG. 1 is a perspective view of an inductively heated applicator system in accordance with an embodiment of the present invention.
Figure 2:
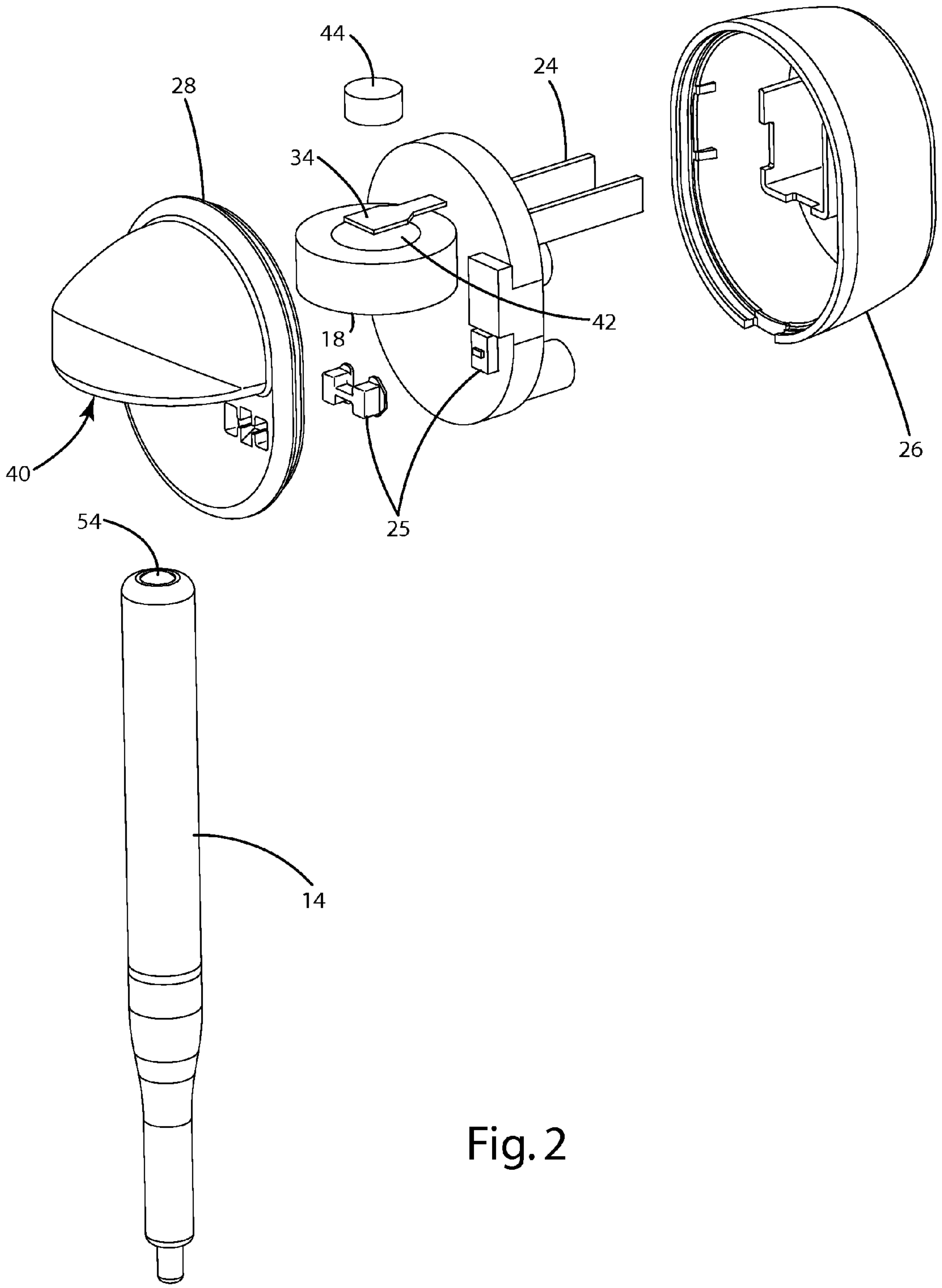
FIG. 2 is an exploded perspective view of the system showing the applicator pen removed from the heating module.
Figure 3:
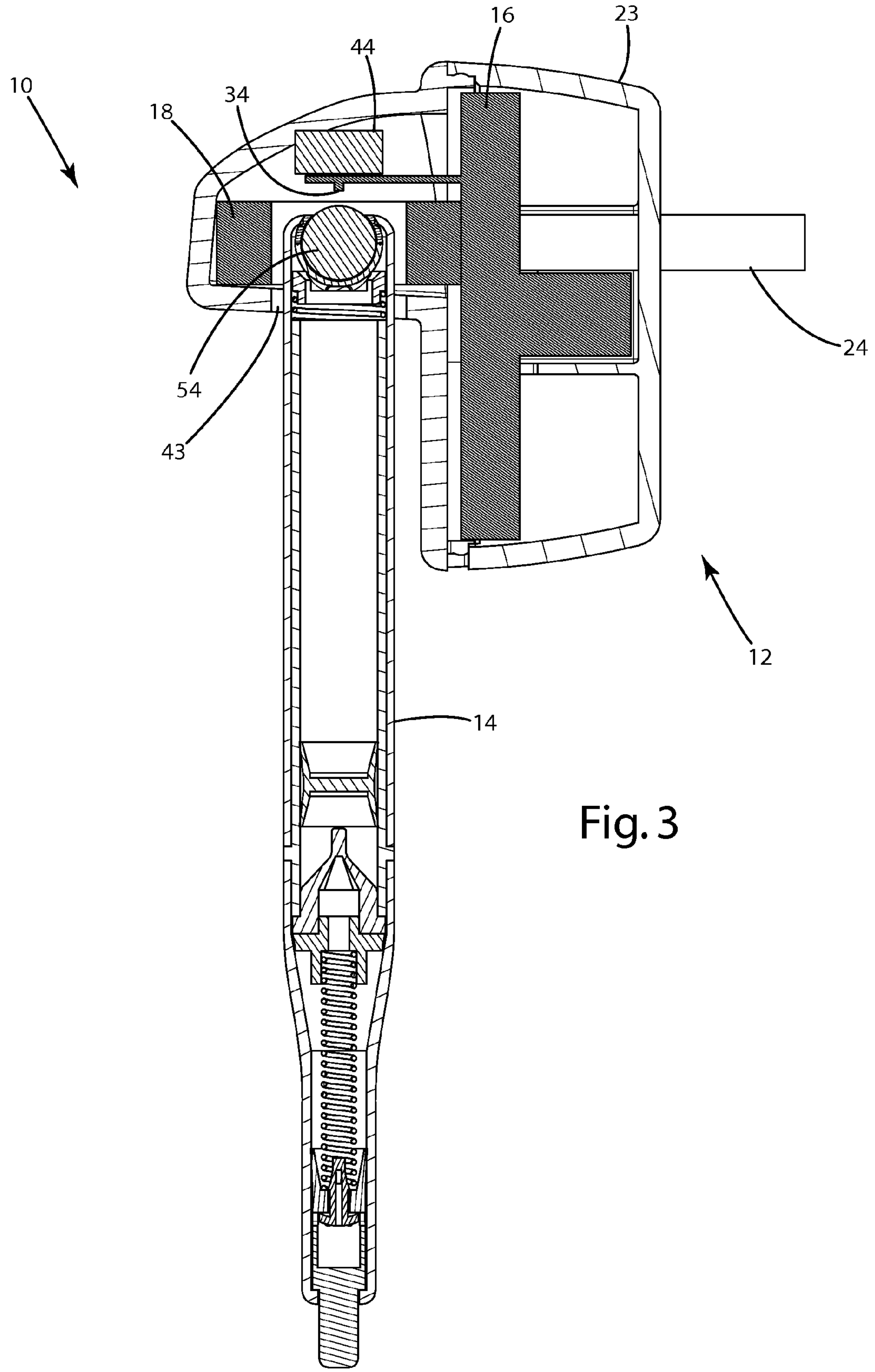
FIG. 3 is a sectional view of the system showing the applicator pen docked in the heating module.
Figure 4:
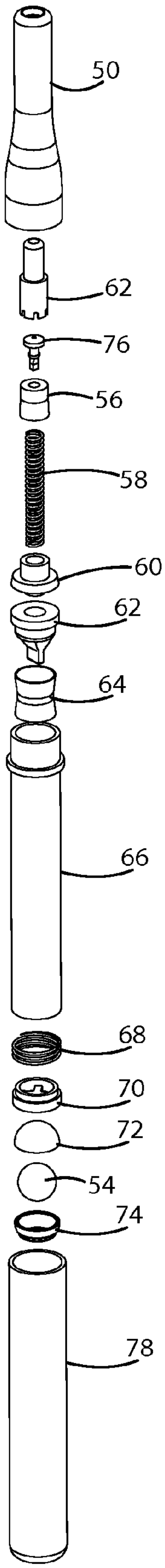
FIG. 4 is an exploded view of an applicator pen in accordance with an embodiment of the present invention.
Figure 5:
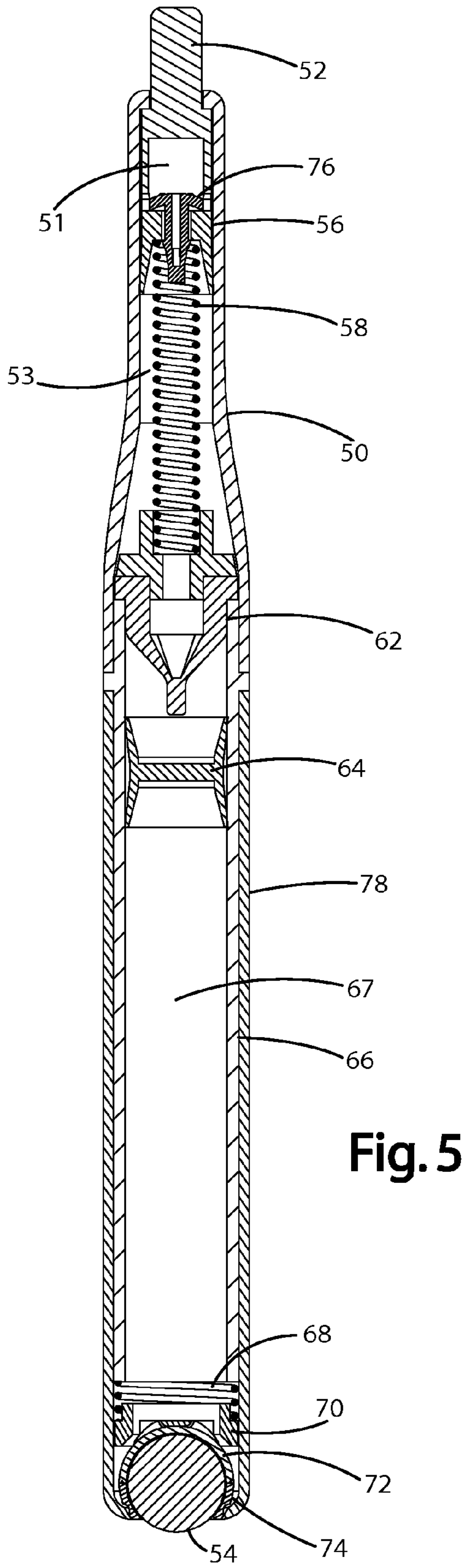
FIG. 5 is a sectional view of the applicator pen.
Figure 8:
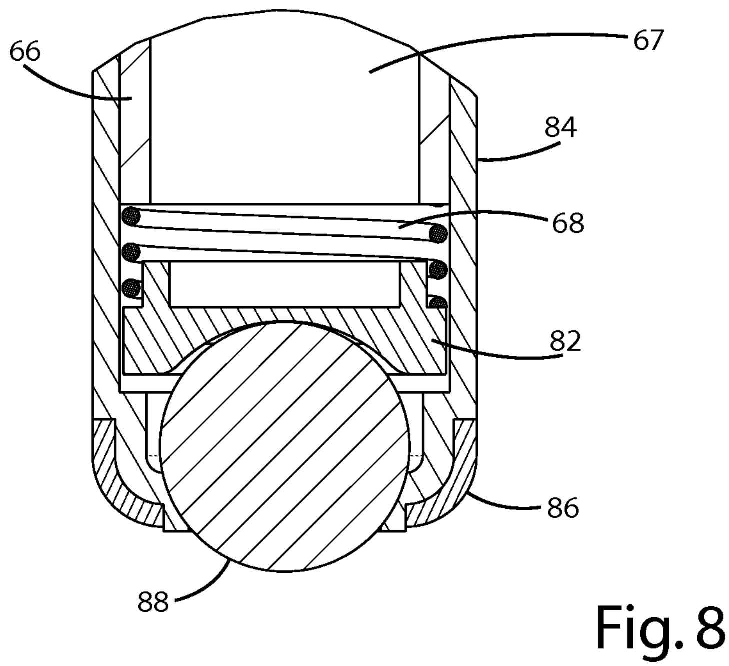
FIG. 8 is a sectional close-up view of an alternative embodiment of an applicator pen tip.

An inductively-heated applicator system in accordance with an embodiment of the present invention is shown in FIGS. 1-3. The applicator system 10 generally includes a heating module 12 and an applicator 14. The heating module 12 includes circuitry 16 for generating a varying electromagnetic field. The circuitry 16 may include a primary 18 for generating the electromagnetic field. The heating module 12 may also include a dock 43 for removably retaining the applicator 14 in the presence of the electromagnetic field. The heating module 12 may include a magnet 44, or other retaining mechanism to assist in retaining the applicator 14. The applicator 14 includes a dispensing system, an applicator system and a heating element 22. The heating element 22 may be independent or part of the dispensing or applicator system. In the illustrated embodiment, the heating element 22 is a roller element that is inductively heated when positioned within the electromagnetic field. In an alternative embodiment the heating element 22 may be conductive tip 86 attached to the end of the applicator 14, as shown in FIG. 8. The applicator system 12 may include temperature monitoring circuitry for monitoring the heating element 22 and providing feedback to the applicator system 10 to control the temperature of the heating element 22.

The heating module 12 of the illustrated embodiment is configured to plug into and be supported by a power outlet, such as a standard 110V receptacle. The heating module 12 may be configured to receive power from other power sources, including other types of power outlets, such as European standard 220V outlet. The heating module 12 can be designed to be supported by essentially any type of power outlet. Alternatively, the heating module may be supported independently of the power outlet. For example, the heating module may be a freestanding unit with a power cord that plugs into a power outlet.

Figure 12:
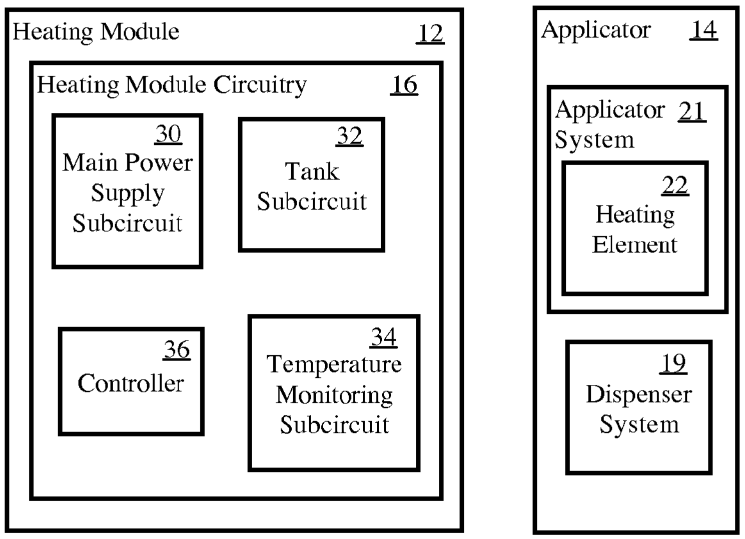
FIG. 12 is one embodiment of the block diagram of the inductively heated applicator system.

In the illustrated embodiment, the heating module 12 generally includes circuitry 16, a dock 43, a housing 23 and a plug 24. The heating module circuitry 16 controls operation of the applicator system 10. Perhaps as best shown in the FIG. 12 block diagram, the heating module circuitry 16 generally includes a main power supply subcircuit 30, a tank subcircuit 32, a temperature monitoring subcircuit 34 and a controller 36. In the embodiment illustrated in FIGS. 10A and 10B, the controller 36 is a digital signal controller, such as the 44-Pin dsPIC30F2023 Enhanced Flash SMPS16-Bit Digital Signal Controller available from Microchip Technology Inc. of Chandler, Ariz. The controller 36 is programmed to control operation of the system 10, and may access external supplemental memory 38, such as 24AA64/SOIC EEPROM. The controller 36 may also include internal memory (not shown). The controller 36 may also include an external clock oscillator 40, if desired.

In the illustrated embodiment, the main power supply subcircuit 30 generally includes a rectifier 100, a driver 102 and a pair of switches 104*a-b*. The rectifier 100 converts incoming AC power to DC power. In the illustrated embodiment, the rectifier 100 receives 120V AC input power via jumper 106. Jumper 106 may be connected to a wall outlet or other source of 120V AC power. The output of the rectifier 100 is connected to the switches 104*a-b*. A capacitor, such as capacitor 105 in the illustrated embodiment, may be used as a shunt for high frequency noise in the rectified signal. In the illustrated embodiment, the switches 104*a-b* are FETs, such as FDS2672, 200V N-Channel UltraFETs Trench MOSFETs, which are available from Fairchild Semiconductor of South Portland, Me. In this embodiment, the driver 102 is a half-bridge driver, such as the L6384 high-voltage half bridge driver available from STMicroelectronics of Geneva, Switzerland. The driver 102 controls the timing of the FETs 104*a-b* to generate a high-frequency AC signal in the tank subcircuit 32. The main power supply subcircuit 30 may also include an “overtemp” input that is coupled to a temperature sensor (described below) to disable the half-bridge driver 102 if the applicator exceeds a maximum temperature. The main power supply subcircuit 30 may also include a “coil0_L” input that is coupled to the controller 36 to provide instructions to the driver 102.

In the illustrated embodiment, the tank subcircuit 32 is a series resonant tank subcircuit, however, the illustrated tank subcircuit 32 may be replaced by other suitable tank subcircuits. The tank subcircuit 32 generally includes a capacitor 108 and a primary 110. The value of capacitor 108 may vary from application to application, for example, to adjust the resonant frequency of the tank subcircuit 32. The primary 110 may be a coil of wire (e.g. Litz wire) or other circuit component capable of generating a suitable electromagnetic field in response to the power supplied to the tank subcircuit 32. For example, the primary 110 may be a printed circuit board coil in accordance with U.S. Ser. No. 60/975,953, which is entitled “Printed Circuit Board Coil” and filed on Sep. 28, 2007 by Baarman et al, and which is incorporated herein by reference in its entirety.

Figure 10A:
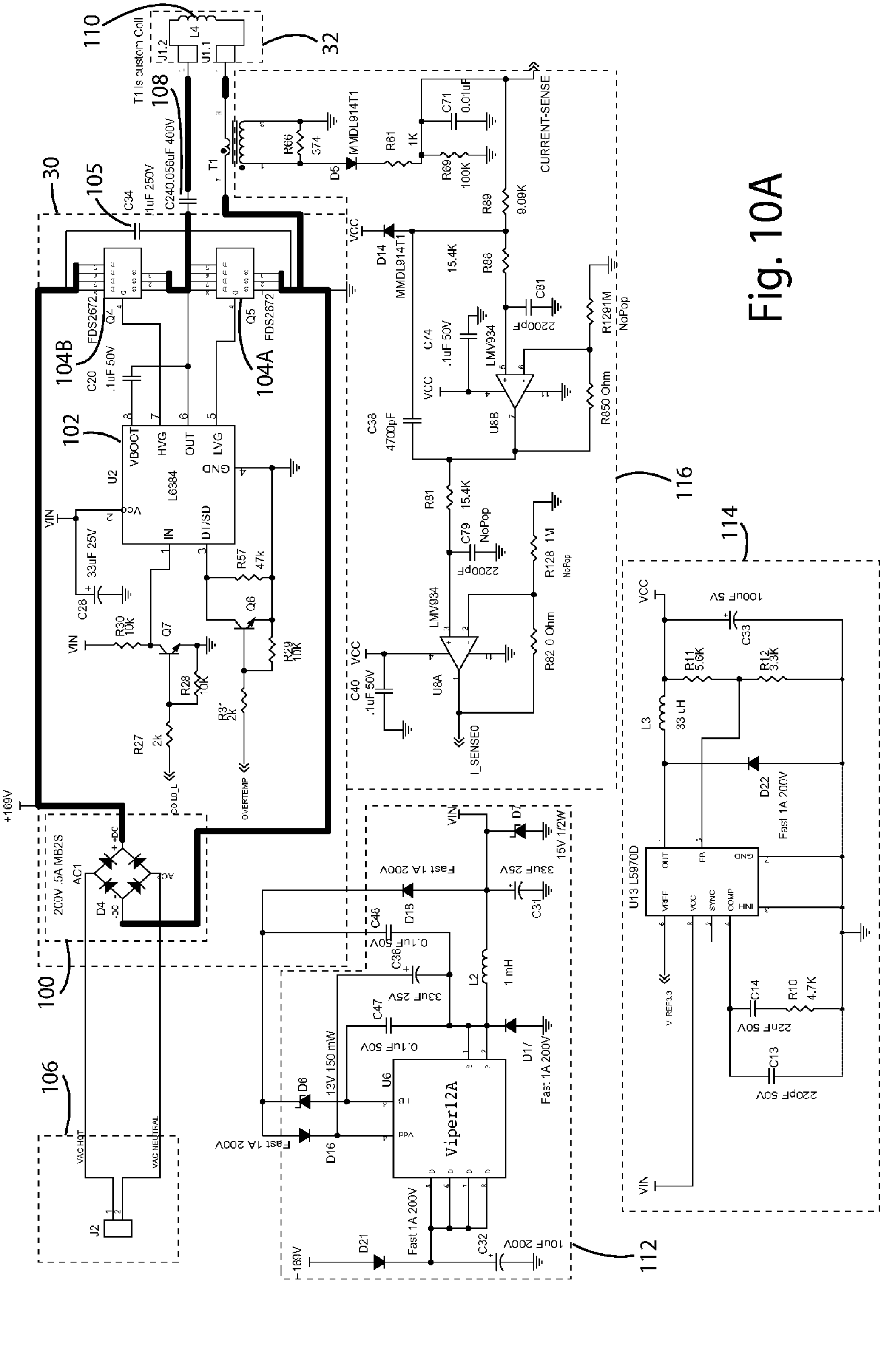
FIG. 10A is a first portion of the schematic diagram of one embodiment of the control system.
Figure 10B:
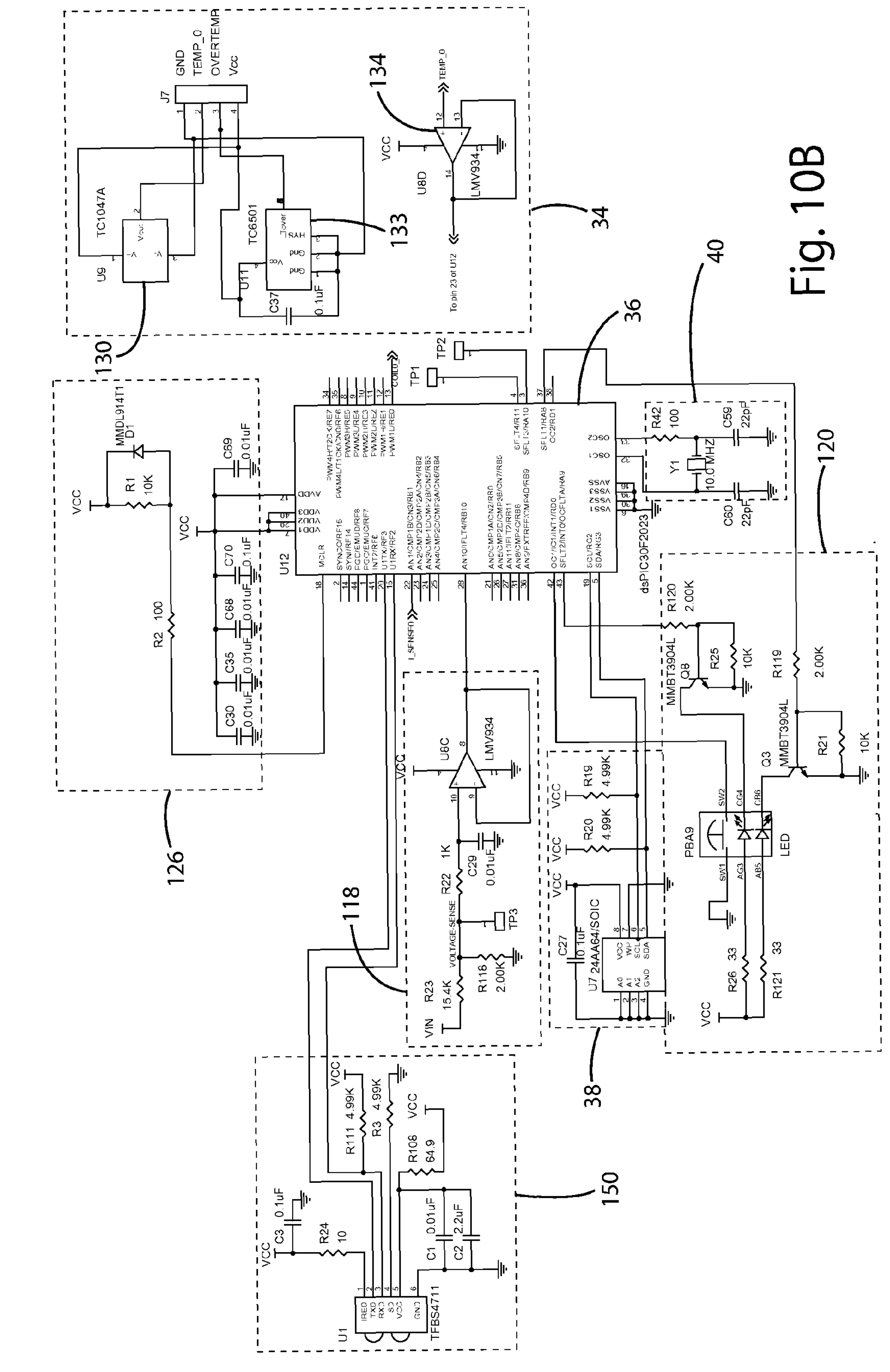
FIG. 10B is a second portion of the schematic diagram of one embodiment of the control system.

In the illustrated embodiment, the circuitry 16 also includes separate operating power supplies to provide operating power for various circuit components. As shown in FIG. 10A, operating power supply subcircuit 112 generates approximately 15V DC to provide power for logic, FET drivers and other circuit components that operate on 15V DC. Referring again to FIG. 10A, operating power supply subcircuit 114 generates approximately 5V DC to provide power for microprocessors, op amps and other circuit components that operate on 5V DC. Additional or fewer power supplies may be included in alternative embodiments.

In the illustrated embodiment, the circuitry 16 also includes a current sensor subcircuit 116. The current sensor subcircuit 116 may be used to determine if the applicator 14, or a foreign object, is present. The current sense subcircuit 116 may also be used for diagnostics. In alternative embodiments the current sense subcircuit 116 may be used to facilitate additional features. For example, the heating module circuitry 16 may include the resonant seeking circuit of the inductive power supply system disclosed in U.S. Pat. No. 6,825,620, which is entitled “Inductively Coupled Ballast Circuit” and issued Nov. 30, 2004, to Kuennen et al; the adaptive inductive power supply of U.S. Pat. No. 7,212,414, which is entitled “Adaptive Inductive Power Supply” and issued May 1, 2007, to Baarman; the inductive power supply with communication of U.S. Ser. No. 10/689,148, which is entitled “Adaptive Inductive Power Supply with Communication” and filed on Oct. 20, 2003 to Baarman; the inductive power supply for wirelessly charging a LI-ION battery of U.S. Ser. No. 11/855,710, which is entitled “System and Method for Charging a Battery” and filed on Sep. 14, 2007 by Baarman; the inductive power supply with device identification of U.S. Ser. No. 11/965,085, which is entitled “Inductive Power Supply with Device Identification” and filed on Dec. 27, 2007 by Baarman et al; or the inductive power supply with duty cycle control of U.S. Ser. No. 61/019,411, which is entitled "Inductive Power Supply with Duty Cycle Control" and filed on Jan. 7, 2008 by Baarman—all of which are incorporated herein by reference in their entirety.

The circuitry 16 may include a temperature monitoring subcircuit 34 having one or more temperature sensors to control the applicator 14 temperature. In the illustrated embodiment, temperature sensor 130 provides the controller 36 with a signal indicative of the temperature of the applicator 14 for temperature control purposes and an over-temperature sensor 133 to shut down the half-bridge driver 102 if the applicator 14 exceeds a maximum temperature. The temperature sensor 130 may be a temperature-to-voltage converter, such as the TC1047A available from Microchip Technology Inc. The output of the temperature sensor 130 may be connected to the controller 36 through buffer 134. The buffer 134 assists in providing sufficient current for the analog to digital conversion of the temperature sensor reading. The over-temperature sensor 133 may be a temperature switch, such as the TC6501 ultra small temperature switch available from Microchip Technology Inc. The over-temperature sensor 133 is connected to the driver 102 to disable the driver 102 if the maximum temperature is exceeded. Additional, different or less temperature monitoring circuitry may be included in alternative embodiments.

The circuitry 16 may also include an iRdA communication subcircuit 150 to provide wireless communications with the controller 36 when desired. The wireless communication subcircuit 150 can be used for diagnostics, programming and other functions.

The circuitry 16 may include a voltage sensor subcircuit 118. In the illustrated embodiment, the voltage sensor subcircuit 118 is used for diagnostic purposes. In alternative embodiments, the voltage sensor subcircuit 118 may be deleted or used for other purposes.

As noted above, the circuitry 16 may include memory 38. The memory 38 may be used to save applicator system parameters or other information. Memory 38 may be provided on the controller 36 or elsewhere in circuitry 16.

The circuitry 16 may also include user input and LED driver circuitry 120. In the illustrated embodiment, the user input is a simple on/off switch. In other embodiments, the user input may provide more sophisticated control. For example, the user input could be a dial capable of adjusting the temperature range of the applicator 14. The LED driver circuitry may be used to indicate the status of the applicator system 10. In one embodiment, blinking lights indicate that the applicator 14 is currently being heated, a solid light indicates that the applicator 14 has reached temperature and fast blinking indicates a fault condition. In the illustrated embodiment there are two primary fault conditions, either the applicator 14 is missing or an over temperature condition occurred. In alternative embodiments there may be different LED schemes and different fault conditions. In other embodiments, other user interface features may replace or supplement the LEDs. For example, audio or other types of feedback may be used to indicate a fault or ready condition.

As noted above, the circuitry 16 may include an external clock oscillator 40. The external clock oscillator 40 may be a more accurate clock for use in controlling the timing of the FETs 104*a*-*b* in the power supply circuit 30. In alternative embodiments the controller 36 may use an internal clock to control the FET timing.

The circuitry 16 may include power conditioning circuitry 126. The power conditioning circuitry 126 in the illustrated embodiment may be used to reset the processor.

The housing 23 is designed to contain the circuitry 16. In the illustrated embodiment, the housing 23 includes a base 26 and a cover 28, perhaps best shown in FIG. 2. The base 26 supports and contains the main portion of the circuitry 16. The cover 28 closes the base 26 and houses the primary 18. In this embodiment, the cover 28 is shaped to define a dock 43. For example, the cover 28 may include a cowl 40 that encloses the primary 18 and defines a central opening 42 to permit the applicator pen 14 to be inserted into the dock 43 and into the center of the primary 18. The cover 28 may include a magnet 44 to removably retain the applicator 14. The magnet 44 may be positioned to interact with the roller element 22 to secure the applicator 14. Alternative applicator retention mechanisms, such as snap-fitting or frictional fitting, may be used instead of or in addition to magnet 44. The switch and LEDs 25 integrated with housing 23 may interface with the user interface and LED driver circuitry 120 to provide user control and status feedback to the user as described above. In alternative embodiments, the switch and LEDs may be deleted or replaced with suitable alternative components.

The present invention is suitable for use with a wide variety of types and styles of applicators. Perhaps best shown in FIG. 12, the applicator 14 generally includes a dispenser system 19, an applicator system 21 and a heating element 22. In the illustrated embodiment, the applicator 14 is an applicator pen with a plunger and check valve system to force product of the applicator and a roller element 54 to apply the product. Further, in the current embodiment, the roller element 54 also acts as a heating element. Other applicators may include additional, different or fewer components. The dispenser system 19 may be replaced with essentially any system or combination of systems capable of dispensing product. For example, the dispensing system 19 may be a plunger system, spring system, vacuum system or threading system. Alternatively, the dispenser system 19 may be inherent in the applicator configuration, for example, shaking or squeezing the applicator may enable suitable dispensing of product from the applicator. These examples of dispenser systems are merely exemplary, essentially any suitable dispenser system may be integrated into the applicator 14. The applicator system 21 may be replaced with essentially any system or combination of systems capable of applying product. For example, the applicator system may include a roller element 54, such as a roller ball or roller cylinder. The applicator system may include a heating element 22. In some embodiments, the roller element may also be a heating element. In some embodiments, an applicator system, such as a roller element, may also be a sufficient dispenser system to extract product from the applicator. In some embodiments, a roller element may be the dispenser system, the applicator system and the heating element.

In the embodiment illustrated in FIGS. 3-7, the applicator pen generally includes a stem 50, a body 66 and a cap 78. The stem 50 is an elongated element that defines an interior space 53 to receive the body 66. The stem 50 may also house a dispenser system for creating pressure within the interior space 53 to assist in dispensing product. In the illustrated embodiment, the dispenser system includes a plunger 52, an umbrella valve 76, a pump piston 56, a pump spring 58, a fixture 60 a check valve 62, a pump piston 64 and an applicator check valve assembly (described below). An air cavity 51 is defined between the pump piston 56 and the plunger 52. The body 66 of the illustrated embodiment is generally tubular defining an interior space 67 that houses product or product capsules. The body 66 may also house a product piston 64 for pressurizing the interior space 67. The cap 78 is an elongated element that receives body 66 and helps define interior space 67. The cap 78 generally includes an applicator system in the form of a roller element 54. In the illustrated embodiment, the roller element 54 is also part of the applicator check valve assembly of the dispenser system. The applicator check valve assembly generally includes a spring 68, a retainer 70, an isolator 72, 74 and a rolling element 54.

In operation, the applicator 14 is primed by depressing the plunger 52, which in turn pushes the pump piston 56 creating air pressure within interior space 53. Air pressure is equalized within interior space 53 thorough check valve 62 and into interior space 67 that contains the product. As air pressure is applied to the product piston 64, the piston 64 applies pressure to the product, which is maintained by check valve 62. With pressure applied to the product, product will be dispensed when the roller element 54 is depressed against the skin to create an external flow path.

The plunger 52 may be primed numerous times. The maximum air pressure may be controlled by the umbrella valve 76 set point. The umbrella valve also allows for new air to enter interior space 53 on the return stroke created by the pump spring 58. That is, on the return stroke, a vacuum is created in interior space 53, which pulls air from cavity 51 through the umbrella valve 56. There is an air flow path between cavity 51 and external the applicator. In the illustrated embodiment, an air flow path exists between the plunger 52 and the stem 50 The dispense cycle may be repeated as desired or based on a particular application dosage. The dose amount may be controlled by adjustment of the maximum pressure allowed by the pressure system, or by other means. In some embodiments this could be user adjustable.

Figure 6:
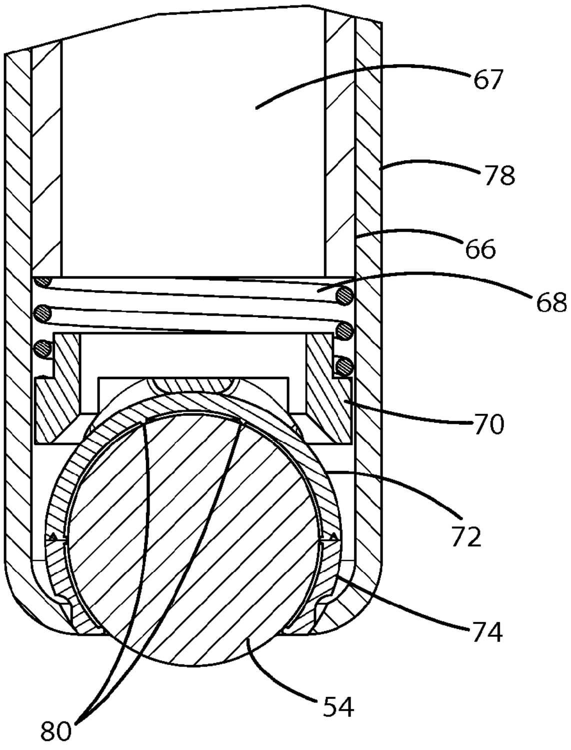
FIG. 6 is a sectional close-up view of the applicator pen tip in a closed state.
Figure 7:
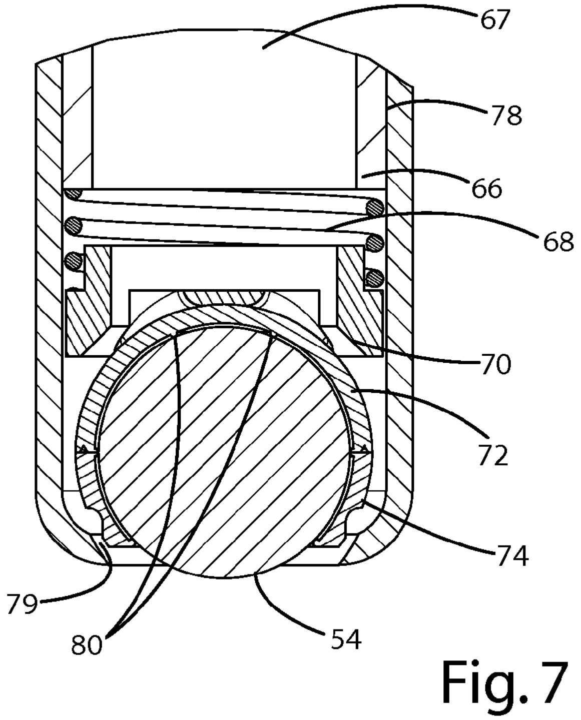
FIG. 7 is a sectional close-up view of the applicator pen tip in an open state.

The spring 68 is biased such that the applicator 14 defaults to a closed state, as shown in FIG. 6. Applying a sufficient amount of external pressure on the roller element 54 causes the spring 68 to depress to an open position, illustrated in FIG. 7. In the open position, a flow path from interior space 67 to outside the applicator 14 is created via gap 79. If the applicator 14 is sufficiently primed, product will dispense through gap 79. Gap 79 may be a ring, slots or any other type of opening that allows product to be dispensed out of the applicator 14. The roller element 54 may be used to distribute the dispensed product as the user sees fit.

In the embodiment illustrated in FIGS. 3-7, the roller element 54 functions as the heating element. The roller element 54 may be manufactured from essentially any material capable of being inductively heated in the presence of an electromagnetic field. For example, the roller element may be manufactured from metal, compounds of metal and organics or ceramics, or plastic with metal mixed. The roller element 54 may also be manufactured from a material selected based on the desired heat capacity. For example, some or all of the roller element may be manufactured using a material with relatively high heat capacity, such as ceramic. In alternative embodiments, where the roller element is not a heating element, the roller element may be manufactured from essentially any suitable material. In some embodiments, the roller element 54 may be textured to increase or control the thickness, or other characteristics, of the applied product.

Some or all of the temperature monitoring circuitry 34 is positioned near or in contact with the roller element 54. In operation, the controller 36 controls operation of the heating module 12 in response to the output of the temperature monitoring circuitry 34, for example, by engaging and disengaging the main power supply subcircuit 30 to maintain the roller element 54 at the desired temperature. If the roller element 54 exceeds the maximum temperature, the over-temperature sensor 133 may bypass the controller 36 and shut off the driver 102.

As noted above, the embodiment illustrated in FIGS. 3-7 includes an isolator 72, 74 and retainer 70. In the illustrated embodiment, the isolator internally isolates the roller element 54 from the flow path of the product and thermally isolates the roller element from the product. The isolator may be manufactured as one or multiple pieces. In the embodiment illustrated in FIGS. 3-7 the isolator includes a first portion 74 and a second portion 72. In embodiments where the roller element 54 is also a heating element, the isolator assists in minimizing the amount of heat transferred to product within the applicator 14. Although heated product may be desired at the time of application, it may be undesired at other times because it can increase the rate at which the product degrades. Therefore, in some applications it is desirable to minimize the amount of heat transferred to the product inside the applicator 14. To further assist in minimizing heat, protrusions 80 may be included on the internal surface of the isolator to minimize the direct contact between the roller element 54 and the walls of the isolator 72,74. Further, the protrusions may also enable the roller element 54 to roll more easily in the isolator 72, 74.

Figure 9:
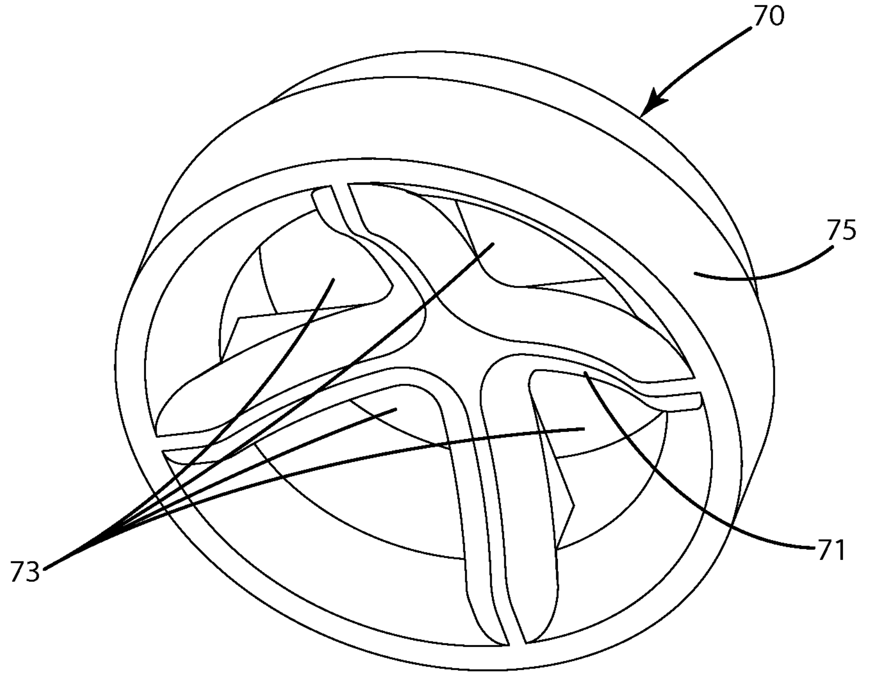
FIG. 9 is a perspective view of one embodiment of the retainer.

In embodiments that include an isolator, the retainer 70 may be configured to assist in both retaining the roller element in position and creating a flow path around the isolator. A perspective view of the retainer of the embodiment described in FIGS. 3-7 is shown in FIG. 9. The retainer 70 includes a generally cylinder portion 75 that includes a roller interface portion 71. Together, the cylinder portion 75 and the roller interface portion 71 define a number of holes 73 where product can flow. In alternative constructions of the retainer 70, the roller interface portion is solid and the cylinder portion 70 includes a number of holes that allow product to flow past the retainer 70. In some embodiments, such as the embodiment shown in FIGS. 1-2, a retainer 70 may be unnecessary and may be deleted. In other embodiments, such as the FIG. 8 embodiment described below, the retainer may include a hole in the roller interface portion 71 that allows the roller element 54 direct access to the product in interior space 67.

An alternative applicator 14 tip is illustrated in FIG. 8. In this embodiment, the roller element 88 need not be a heating element because conductive tip 86 is made from material that may be heated in the presence of an electromagnetic field. The roller element 88 may be made from plastic or other non-conductive material. As with the FIGS. 3-7 embodiment, this embodiment minimizes the heat transfer to product internal to the applicator 14. As mentioned above, because there is no isolator in this embodiment, the product may flow directly from the interior space 67 onto the roller element 88. The retainer 82 may be configured to allow fluid communication between interior space 67 and roller element 88.

Figure 13:
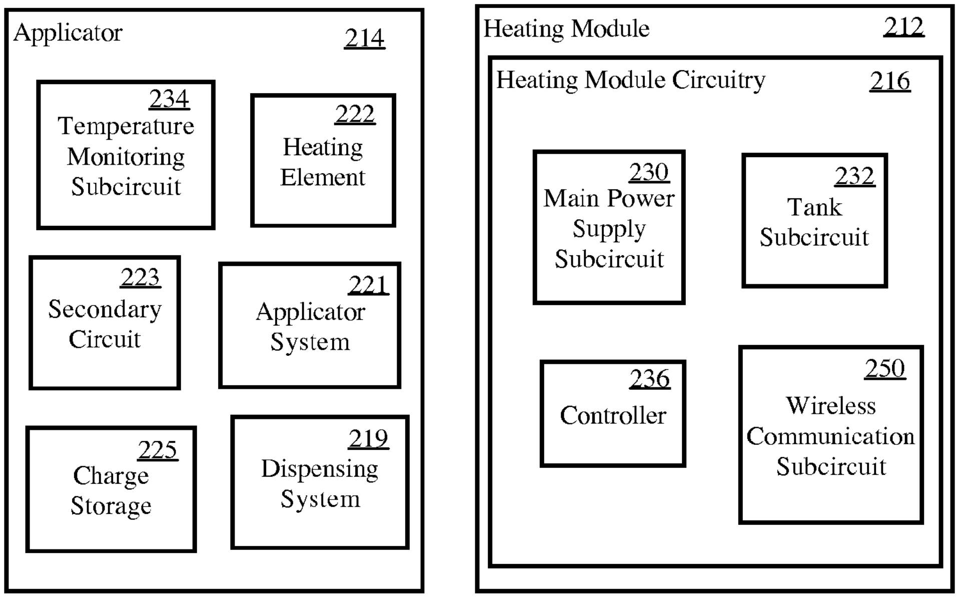
FIG. 13 is an alternative embodiment of the block diagram of the inductively heated applicator system.

In the embodiments described above, the inductively-heated applicator system 10 includes an applicator 14 that is essentially passive in the sense that it includes no electronics and the heating element 22 is heated inductively. In an alternative embodiment, the applicator may include a resistive heating element and the circuitry required to apply power to the resistive heating element. For example, in the alternative system illustrated in FIG. 13, the heating module 212 generates an electromagnetic field that the applicator 214 converts to power with secondary circuit 223 in order to apply power to heating element 222. The applicator system 221 and dispenser system 219 may be essentially any systems suitable for applying and dispensing product. The controller 236 may be essentially any controller suitable for controlling the heating module. Optional charge storage 225 may be included on the applicator. The charge storage 225 may be a rechargeable battery so that the pen may be heated even while removed from the heating module. The charge storage 225 may hold a sufficient amount of charge in order to maintain a selected temperature of the heating element. In the FIG. 13 embodiment, the temperature monitoring subcircuit 234 resides on the applicator instead of the heating module as described above. The temperature monitoring subcircuit 234 may monitor the heating element temperature and provide protection by disconnecting power to the heating element 222 if a threshold temperature is exceeded. In some embodiments, the temperature monitoring subcircuit 234 may wirelessly communicate with the wireless communication subcircuit 250 in order to shut off the main power supply subcircuit or provide other functionality.

In the embodiments described above, the applicator 14 has been described in connection with a roller element. In alternative embodiments, the roller element may be replaced with another application mechanism. Further, the shape of the applicator has been illustrated and described as an applicator pen. The size, shape and configuration of the applicator may vary from application to application. In one embodiment, the applicator is shaped to match a specific body part, such as a user's shoulders or knees.

The system 10 may be configured to heat the applicator to essentially any desired temperature. In the illustrated embodiment, the system 10 is configured to apply between 0.5 amps and 1.5 amps of current to the primary. In this embodiment, the system 10 is configured to apply product at temperature between 35 C and 45 C.

Figure 11:
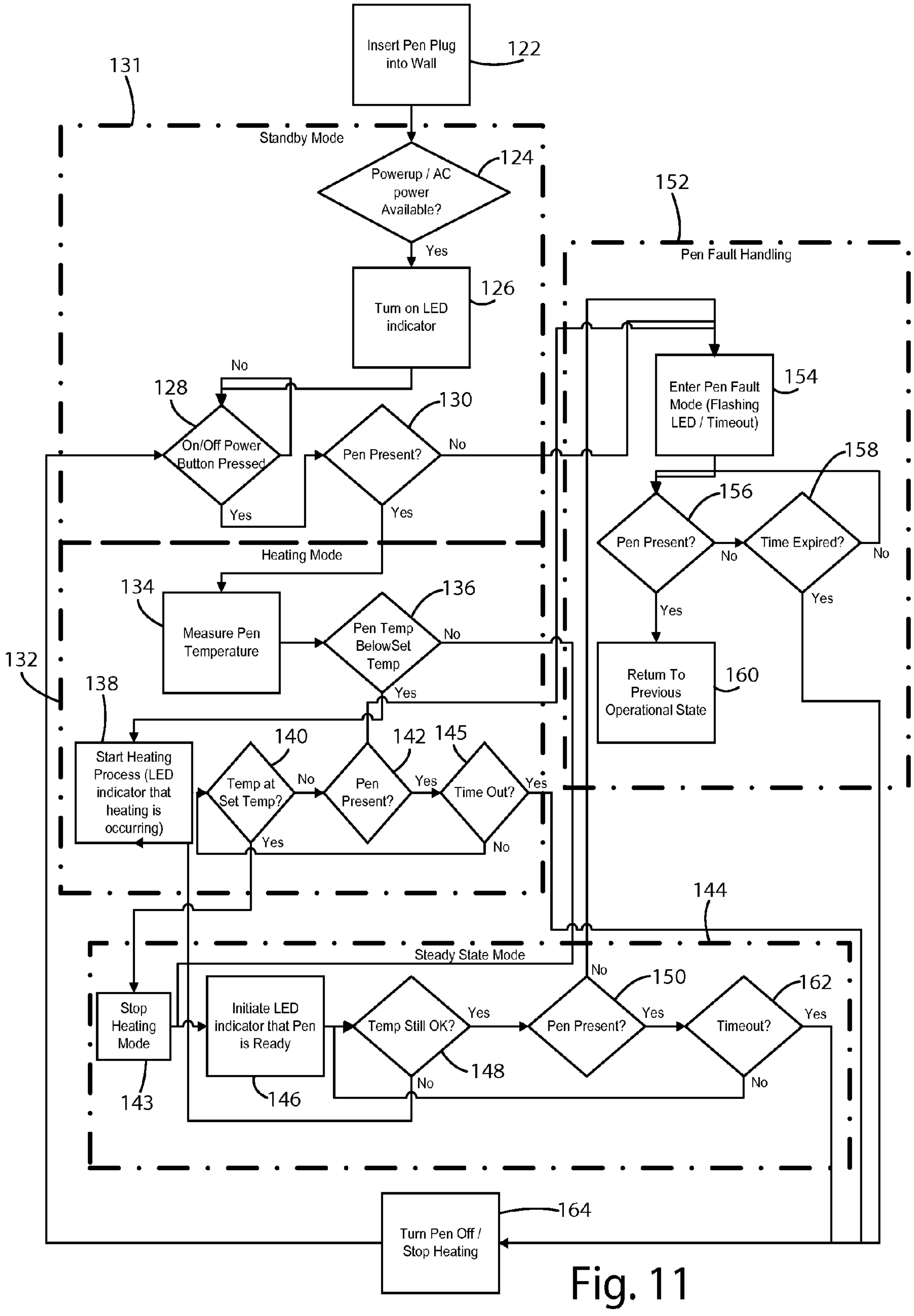
FIG. 11 is a flowchart of one embodiment of the control algorithm of the control system.

Exemplary operation of the system 10 is described in connection with the flowchart illustrated in FIG. 11. Once the heating module plug is inserted into the wall 122, the heating module enters standby mode 131. A determination is made in the heating module of whether sufficient AC power is available 124. If sufficient power is available, an LED indicator is turned on to indicate standby mode 126. A determination of the state of the on/off power button is made 128. If the power button is off, the system remains in standby mode 131 until the button is pressed. If the power button is on, a determination about the presence of the applicator is made 130. If the applicator is present heating mode 132 is entered. If the applicator is not present, the system enters pen fault handling mode 152.

In heating mode 132, the applicator temperature is measured 134. The current applicator temperature is compared to a threshold temperature 136. If the current applicator temperature is above the threshold then the system enters steady state mode 144. If the current applicator temperature is below the threshold then the heating process is started and the LED indicator is changed to reflect that the applicator is being heated 138. Another temperature measurement is taken and compared to the threshold temperature 140. If the current applicator temperature is below the threshold temperature then the system checks if the pen is present 142. If the applicator is still present then a check is made to see if a timeout has occurred 145. If a timeout has occurred then the applicator is turned off 164 and enters standby mode 131. If a timeout has not occurred then the applicator continues to heat until the temperature reaches the set temperature 140. If the applicator is not present, the applicator fault handling state 152 is entered. If the current applicator temperature is above the threshold temperature then steady state mode 144 is entered.

In steady state mode 144, the heating process is halted 143 and an LED is changed to indicate that the applicator is ready for use 146. An applicator temperature measurement is made and compared to an acceptable temperature range 148. If the current applicator temperature has fallen below the acceptable temperature range then the heating process 138 is started again. If the temperature is within the acceptable temperature range then a determination is made of whether the applicator is present 150. If the applicator is not present the applicator fault handling state 152 is entered. If the applicator is present, a comparison between the elapsed time in steady state mode 144 and a threshold is made 162. If the elapsed time is below the threshold then the temperature is measured and compared to the acceptable temperature range again 148. If the elapsed time is greater than the threshold the applicator system is turned off 164 and the system enters standby mode 131.

In the applicator fault handling state 152, an LED is changed to a flashing state 154. A determination of whether the applicator is present is made 156. If the applicator is present then the system returns to the previous operational state 160. If the applicator is not present then a determination of whether time has expired is made 158. If time has not expired, presence of the applicator is checked 156. If time has expired, the applicator is turned off 164.

Reference to various timeouts is made throughout the exemplary heating module flowchart, in some applications, these timeouts may refer to a single master timeout condition, in other applications, each timeout condition may exist separately and be based on any number of suitable factors. For example, the amount of time waiting in steady state mode 162 before shutting off may be the same or different from the amount of time waiting in heating mode 132 before entering the pen fault handling state 152.

There may be hysteresis in the heating module control system. From the steady state mode 131, the temperature of the applicator may drop some number of degrees below the set point before the heating mode 132 is entered. In other embodiments, there may be a number of intermediate heating states in which the heating parameters are changed to allow a slower approach to the set point temperature.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. An inductively-heated applicator system for applying a product comprising:

a heating module having a dock and an inductive primary to generate an electromagnetic field; and a wireless applicator removably positionable on said dock, said wireless applicator having:

a dispenser system for creating pressure to dispense said product from a product cavity, a heating element and a roller element for applying said product, said heating element being heated by said electromagnetic field, said heating element configured to heat an area of interest, and a product flow path from said product cavity to the area of interest, said product flow path bypassing said heating element.

2. The system of claim 1 wherein said heating element is manufactured from a direct induction material, whereby heat is induced within said heating element when said heating element is within a suitable electromagnetic field.

3. The system of claim 1 wherein said wireless applicator includes an inductive secondary, said inductive secondary being electrically connected to said heating element, said heating element being a resistive heater, whereby application of electrical power from said secondary to said heating element heats said heating element.

4. The system of claim 1 wherein said wireless applicator includes a heating element isolator that reduces an amount of heat transferred from the heating element to the interior of the wireless applicator.

5. The system of claim 4 wherein said wireless applicator includes a retainer that defines said flow path bypassing said heating element.

6. The system of claim 1 wherein said heating element is a conductive tip of said wireless applicator.

7. The system of claim 1 wherein said heating element includes said roller element.

8. A wireless applicator comprising:

a dispenser system for creating pressure to dispense product from said wireless applicator to an area of interest;

a product cavity in communication with said dispenser system;

an applicator system in communication with said product cavity for applying said product;

a heating element, said heating element capable of being heated by an electromagnetic field, said heating element heats said area of interest; and a product flow path from said product cavity to said area of interest, whereby said product flow path bypasses said applicator system and said heating element.

9. The wireless applicator of claim 8 wherein said heating element is manufactured from a direct induction material, whereby heat is induced within said heating element when said heating element is in within a suitable electromagnetic field.

10. The wireless applicator of claim 8 wherein said wireless applicator includes an inductive secondary, said inductive secondary being electrically connected to said heating element, said heating element being a resistive heater, whereby application of electrical power from said secondary to said heating element heats said heating element.

11. The wireless applicator of claim 8 wherein said wireless applicator includes a heating element isolator that reduces an amount of heat transferred from the heating element to the product while it is traveling in the product flow path.

12. The wireless applicator of claim 8 wherein said heating element is a conductive tip of said wireless applicator, located outside of said product flow path.

13. The wireless applicator of claim 8 wherein said heating element is at least part of said applicator system for applying said product to said area of interest.

14. The wireless applicator of claim 13 wherein said applicator system includes a ball check valve.

15. The wireless applicator of claim 8 wherein said flow path is thermally isolated from said heating element.

16. The wireless applicator claim 8 wherein said applicator includes a retainer that defines the flow path bypassing said heating element.

* * * * *